United States Patent [19]

Ream et al.

[11] Patent Number: 5,127,222
[45] Date of Patent: Jul. 7, 1992

[54] BUFFER REGION FOR THE NACELLE OF A GAS TURBINE ENGINE

[75] Inventors: Jeffrey L. Ream, Tolland; Robert Bubello, North Meriden, both of Conn.

[73] Assignee: United Technologies Corporation, Hartford, Conn.

[21] Appl. No.: 584,557

[22] Filed: Sep. 18, 1990

Related U.S. Application Data

[62] Division of Ser. No. 300,516, Jan. 23, 1989, Pat. No. 5,010,639.

[51] Int. Cl.$^5$ ............................................. F02C 7/18
[52] U.S. Cl. ..................................... 60/204; 60/39.83
[58] Field of Search ................ 60/39.83, 226.1, 39.08, 60/39.07, 204, 39.33, 39.091; 244/57, 53 R

[56] References Cited

U.S. PATENT DOCUMENTS

| | | | |
|---|---|---|---|
| 4,003,200 | 1/1977 | Zerlauth | 60/39.091 |
| 4,249,371 | 2/1981 | Romeyke | 60/39.091 |
| 4,351,150 | 9/1982 | Schulze | 60/39.07 |
| 4,825,644 | 5/1989 | Bubello et al. | 60/39.091 |
| 4,887,424 | 12/1989 | Geidel et al. | 60/39.08 |

Primary Examiner—Richard A. Bertsch
Assistant Examiner—Timothy S. Thorpe
Attorney, Agent, or Firm—Gene D. Fleischhauer

[57] ABSTRACT

A buffer system for cooling a buffer region 66 in the nacelle 14 of a gas turbine engine 12 after engine shutdown is disclosed. Various construction details are developed for positively providing cooling air after engine operation to the buffer region of the nacelle, such as with a blower means 74. A coolable component 96, 98, 100, is disposed in the region. In one detailed embodiment, a shroud 72 extends about the buffer region and at least a portion of the coolable component is disposed in the shroud.

4 Claims, 5 Drawing Sheets

BUFFER REGION FOR THE NACELLE OF A GAS TURBINE ENGINE

This is a division of co-pending application Ser. No. 07/300,516 filed on Jan. 23, 1989, U.S. Pat. No. 5,010,639.

DESCRIPTION

1. Technical Field

This invention relates to a power plant for an aircraft which includes a turbofan, gas turbine engine and a nacelle for the engine, and, more particularly, relates to a thermal buffer region for a component in the nacelle and to a method of creating the buffer region after aircraft engine operation.

2. Background of the Invention

A power plant for large aircraft generally includes a turbofan, gas turbine engine and an associated nacelle for the engine. The nacelle extends circumferentially about the engine, sheltering the engine and providing aerodynamic surfaces which cooperate with the turbofan engine for generating thrust.

The turbofan engine includes a compression section, a combustion section and a turbine section. A primary flow path for working medium gases extends axially through the sections of the engine. An engine casing extends axially through the engine and circumferentially about the flowpath to bound the primary working medium flowpath.

The working medium gases of the primary flowpath are drawn into the compression section where they pass through several stages of compression, causing the temperature and pressure of the gases to rise. The gases are mixed with fuel in the combustion section and burned to form hot, pressurized gases. These gases are a source of energy to the engine and are expanded through the turbine section to produce work.

A secondary flowpath for working medium gases is disposed outwardly of the primary flowpath. The secondary flowpath is annular in shape. The engine has a plurality of fan blades which extend radially outwardly across the primary flowpath and secondary flowpath. These fan blades pressurize working medium gases entering both flowpaths of the engine.

The nacelle includes a fan nacelle and a core nacelle. The core nacelle is spaced from the engine leaving a core nacelle compartment therebetween which extends about the gas turbine engine. The core nacelle is disposed radially inwardly of the fan nacelle leaving a region therebetween for the secondary flowpath.

The core nacelle has an exterior wall and the fan nacelle has an interior wall which extend rearwardly to bound the secondary flowpath. Because the gases of the secondary flowpath flow over the walls of the nacelle, the walls are contoured to minimize the drag effect on high velocity gases in the working medium flowpath and to smoothly duct the gases along the flowpath.

The core nacelle compartment provides an enclosed shelter for engine accessories which are mounted on the exterior of the engine. These accessories might include fuel lines for flowing fuel to the combustion section; an electrical generator for supplying the engine and aircraft with electrical power; and a pneumatic duct for ducting a portion of the compressed gases of the engine through the nacelle and through struts to the aircraft. The gases in the pneumatic duct can have temperatures in excess of six hundred (600) degrees Fahrenheit. The gases may be used, for example, for controlling the environmental conditions of the aircraft and providing anti-icing gases to the aircraft. In addition, hydraulic conduits extend from the aircraft through the pylon into the nacelle. Hydraulic fluid is carried via these conduits to a hydraulic pump driven by the engine to pressurize the hydraulic fluid for use in various applications in the aircraft.

Three conduits are generally associated with each hydraulic system. A suction conduit supplies hydraulic fluid to the hydraulic pump from a tank in the aircraft. A pressure conduit supplies pressurized hydraulic fluid from the hydraulic pump to the aircraft hydraulic system at pressures as high as three thousand pounds per square inch. During operation of the pump, a small amount of hydraulic fluid is bypassed through the pump past seals and is used to lubricate components in the pump and for other functions. A case drain conduit, smaller in diameter than the supply conduit and pressure conduit, is used for returning this hydraulic fluid to the hydraulic fluid supply tank which is located in the aircraft.

Some of the components in the nacelle compartment, such as the hydraulic fluid, are affected by overheating. As will be realized, sources of heat include the engine and associated components, such as the pneumatic ducting and the hydraulic pump which does work on the hydraulic fluid. Accordingly, the nacelle compartment is ventilated during engine operation by cooling passages which flow a portion of the cool pressurized air from the secondary flowpath to the interior of the nacelle.

One example of a cooling passage is an axially extending spray bar at the top of the nacelle. The spray bar flows cooling air into the upper region of the nacelle to ventilate the core nacelle compartment during operation of the engine.

Another example is shown U.S. Pat. No. 4,351,150 issued to Schulze entitled "Auxiliary Air System for Gas Turbine Engine" in which an air ducting pipe is used to duct cooling air to a component which generates heat, such as an electronic engine control, to cool the component. After cooling the control, the air is discharged into a compartment of the nacelle to provide ventilation to the compartment. Such systems may be used in a nacelle which is divided into many subcompartments, each isolated from the other.

Another example of a cooling and ventilating system used in a gas turbine engine nacelle is shown in U.S. Pat. No. 4,019,320 entitled "External Gas Turbine Cooling for Clearance Control" and U.S. Pat. No. 4,069,662 entitled "Clearance Control for Gas Turbine Engine", both issued to Redinger et. al. and assigned to the Assignee of this invention. In these constructions, cool air is bled from the fan discharge duct and is directed externally of the engine case into a region adjacent to seals in the turbine section of the gas turbine engine. Spray bars impinge the cooling air on the engine case to control the diameter of the case and internal operating clearances in the engine which are associated the position of the engine case. After the cool air impinges on the engine case, the air is flowed through the engine compartment to ventilate the compartment.

This cooling of the nacelle compartment is particularly important for hydraulic fluid which is flowed to the aircraft hydraulic system. The hydraulic fluid begins to deteriorate above a certain temperature and the amount of deterioration is a function of the time that it remains at that temperature.

Accordingly, scientists and engineers working under the direction of Applicants' Assignee have considered the impact of nacelle temperatures which result from operation of the aircraft and its gas turbine engine on the thermal life of the hydraulic fluid.

DISCLOSURE OF INVENTION

This invention is in part predicated on the recognition that after the cessation of engine operation, the sensible heat stored in the engine is transferred to air in the engine nacelle causing the temperature of the air to rise and causing heating of components in the engine nacelle, and especially components such as hydraulic conduits in the upper portion of the engine nacelle where the hottest nacelle air is gathered.

According to the present invention, a buffer system for the nacelle of a turbofan, gas turbine engine includes a passage for buffer air and an air moving device for positively moving air to the buffer region of the nacelle after engine operation, the air moving device having a source of energy not dependent on engine operation for supplying the energy at the time the energy is needed to positively move the air.

In accordance with one embodiment of the present invention, the passage is in flow communication with an opening in the nacelle which is used during engine operation to flow air into the nacelle for cooling components which generate heat during engine operation.

A primary feature of the present invention is an air moving device for positively moving air into the nacelle after the cessation of engine operation. One example of such a device is an electric fan. Another feature of the present invention is a buffer region in the nacelle. The buffer region is disposed about a component in the nacelle. One example of a buffer region is the region about the hydraulic conduits in the upper portion of the nacelle. Another feature of the present invention is a passage for ducting cool buffer air to the buffer region after engine operation. Another feature is a source of power for the air moving device, such as a battery located in the aircraft or an auxiliary power unit which provides energy for moving the air. In one detailed embodiment, the buffer region is enclosed in a shroud. The shroud may be insulated with an insulating material. In another detailed embodiment, the hydraulic conduits all have a diameter which is equal to or greater than the diameter of the pressure conduit to increase the thermal capacitance of the conduits in comparison with hydraulic systems having a case drain conduit which is smaller in diameter than the pressure conduit.

A primary advantage of the present invention is the thermal life of a component in the nacelle which results from placing the component in a cooled buffer region after engine operation. In one particular embodiment, the component is hydraulic fluid in the hydraulic conduits of the nacelle. Another advantage is the weight and complexity of the nacelle which results from creating buffer regions for temperature sensitive components after engine operation in a nacelle which is open to the flow of ventilating air during operation of the engine. In one particular embodiment, an advantage is using a passage for cooling air while operating the engine then using the same passage and for buffer air after operating the engine which reduces the complexity of the air moving system and the intrusion of openings into the secondary flowpath of the gas turbine engine.

The foregoing features and advantages of the present invention will become in light of the following detailed description of the best mode of carrying out the invention and in the accompanying drawings.

BEST MODE FOR CARRYING OUT THE INVENTION

Figure 1:
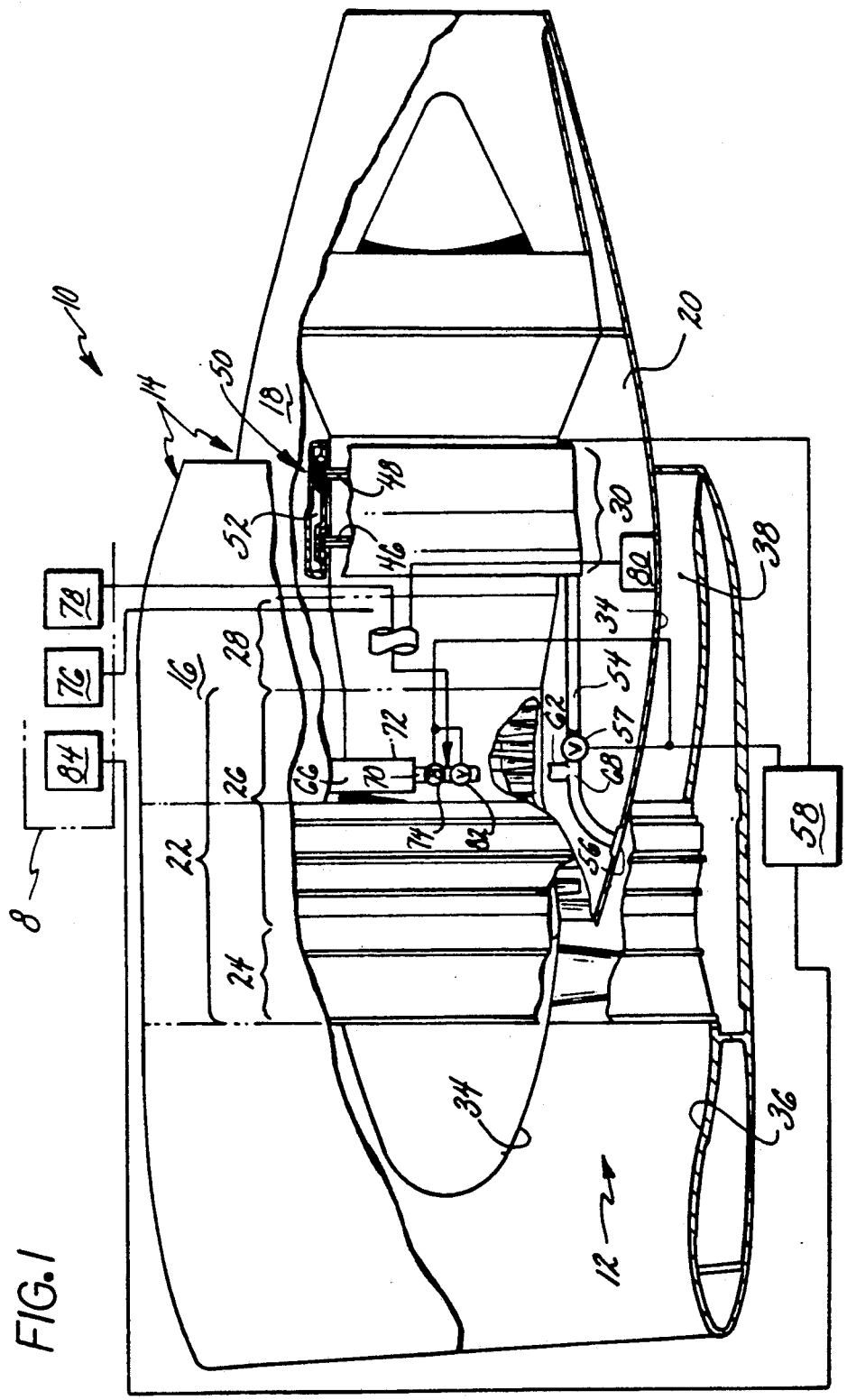
FIG. 1 is a side elevation view in full of a power plant for a gas turbine engine with portions of the nacelle broken away to show a high bypass turbine fan engine and a schematic representation of an electronic engine control for the engine and associated aircraft components, such as a battery, the control center for the aircraft, and an auxiliary power unit.

FIG. 1 shows a portion of an aircraft 8 and a power plant 10 for the aircraft which has a turbofan gas turbine engine 12. The power plant includes a pylon (not shown) for supporting the engine from the aircraft and a nacelle 14 which circumscribes the engine.

The nacelle 14 includes a fan nacelle 16 and a core nacelle 18. The core nacelle is spaced radially from the engine leaving a core compartment 20 therebetween. Accessory equipment for the engine is disposed in the core compartment. The accessory equipment is generally broken away in FIG. 1 to show more clearly the turbofan engine 12.

The turbofan engine 12 has a compression section 22 which includes a fan section 24 and a compressor 26. A combustion section 28 and a turbine section 30 are axially rearward of the compression section. A primary flowpath 32 for working medium gases extends rearwardly through these sections of the engine.

The core compartment 20 has an outer nacelle wall 34 which extends circumferentially about the engine. The fan nacelle 16 has a wall 36 which is spaced radially outward from the outer wall 34 of the core compartment leaving a fan bypass flowpath 38 (secondary flowpath) therebetween. The secondary flowpath extends rearwardly over the nacelle walls 34, 36, is annular, and is disposed outwardly of the primary flowpath. The nacelle walls, which extend rearwardly in the engine to bound the secondary flowpath, are commonly referred to as the fan duct. The fan duct extends rearwardly to the end of the engine along the outer nacelle wall 34 even though the duct is not bounded outwardly by the nacelle wall 36.

The turbine section 30 of the engine has a stator assembly which includes a plurality of rails or flanges, as represented by the first rail 46 and the second rail 48.

The rails extend circumferentially about the exterior of the engine. A shield 50 outwardly of the rails is disposed in the core compartment 20. The shield is spaced radially from the rails and extends axially and circumferentially about the turbine section 30. The shield has a cooling manifold 52 for flowing cooling air about the exterior of the engine and for discharging the cooling air on the exterior of the engine, and thence into the nacelle compartment. The cooling manifold is in flow communication via a first passage 54 with a source of cooling air, such as the secondary flowpath 38. The cooling passage has an opening 56 in the outer wall of the nacelle which receives pressurized air from the secondary flowpath during engine operation.

A valve 57 is used to turn on and off the flow of cooling air to the cooling passage 54 and is responsive to engine operating conditions through an electronic engine control 58. An example of a suitable electronic engine control is the EEC131 model engine control supplied by the Hamilton Standard Division of United Technologies Corporation.

A second passage 62 for buffer air is in flow communication with the opening 56 at a point 68 upstream of the first valve. The second passage discharges cooling air to a selected region, referred to as the buffer region 66, of the engine. The second passage has an opening 70 for discharging cooling air. A shroud 72 extends in the upper portion of the interior of the nacelle. The shroud extends about portions of hydraulic conduits (not shown) on the interior of the shroud which are disposed adjacent the engine in the buffer region 66.

Means, such as the blower means 74, for positively moving air through the second passage 62 and through the shroud 72 to the buffer region after cessation of engine operation is in flow communication with the second passage 62. The means for positively moving air includes a source of energy which is independent of engine operation to enable to enable operation of the means, after cessation of engine operation. The source of power might be the auxiliary power unit 76 (APU) of the aircraft, a battery 78 in the aircraft, a battery 80 in the nacelle or any auxiliary power device which does not depend on operation of the engine to supply power to the engine after the cessation of engine operation.

A second valve 82 is also disposed in flow communication with the second passage. The valve is one example of means for turning off the flow of cooling air through the second passage during engine operation and for permitting the flow of buffer air after the cessation of engine operation. Although the blower means is shown upstream of the second valve, the second valve might be disposed upstream of the blower means.

Control means, such as the electronic engine control 58, for detecting the cessation of engine operation is in communication with the second valve 82 and with the blower means 74. One example of a blower means is an electric fan. The control means turns on the electric fan to positively move air through the second passage 62, sends a signal to close the first valve 57 and sends a signal to open the second valve 82. The control means might be responsive to a signal from the control center 84 in the aircraft or might be responsive by a signal coupling means to parameters of the engine such as the engine overall pressure ratio or fuel flow to the combustion section of the engine.

Figure 2:
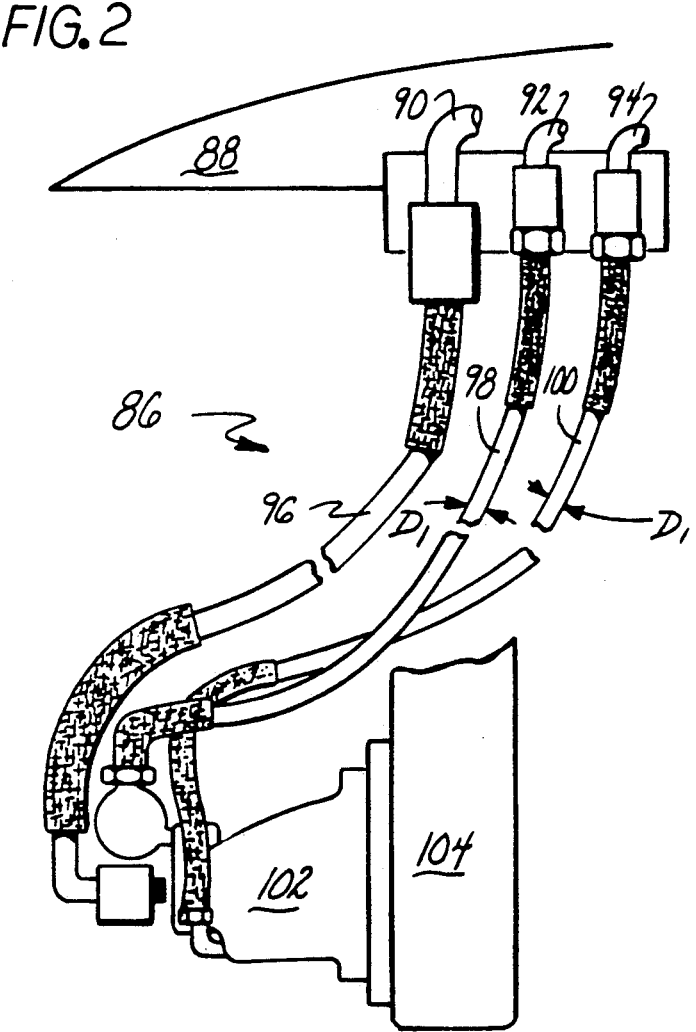
FIG. 2 is a diagrammatic view of a portion of the hydraulic system for the aircraft which includes a hydraulic pump, hydraulic conduits and the interface of the hydraulic conduits with hydraulic conduits of the aircraft.

FIG. 2 is a diagrammatic view of a portion of the hydraulic system 86 for the aircraft which is disposed in the core nacelle 18. The engine pylon 88 provides the support for three conduits 90, 92, 94 from the aircraft. Each conduit is attached to a corresponding conduit in the nacelle such as the suction conduit 96, the pressure conduit 98, and the case drain conduit 100. The hydraulic system includes a hydraulic pump 102. A gear box 104 for providing power to the hydraulic pump is driven by the engine.

The suction conduit 96 is in flow communication through the aircraft conduit 90 with a hydraulic supply tank (not shown) in the aircraft which supplies hydraulic fluid to the hydraulic pump 102. Hydraulic fluid is supplied from the pump to the pressure conduit at a pressure of several thousand pounds per square inch. The pressure conduit 98 is in flow communication with devices which employ the pressurized hydraulic fluid. The case drain conduit collects hydraulic fluid which is used for lubrication purposes and which leaks past seals in the hydraulic pump and provides a return for this leakage or bleed flow to the hydraulic supply tank. This conduit operates at a pressure between one and two hundred pounds per square inch.

As shown in FIG. 2, the case drain conduit and the pressure conduit each have the same diameter $D_1$ and accordingly the same thermal capacitance. The suction conduit has a diameter $D_2$ which is larger than $D_1$ and a larger thermal capacitance.

Figure 3:
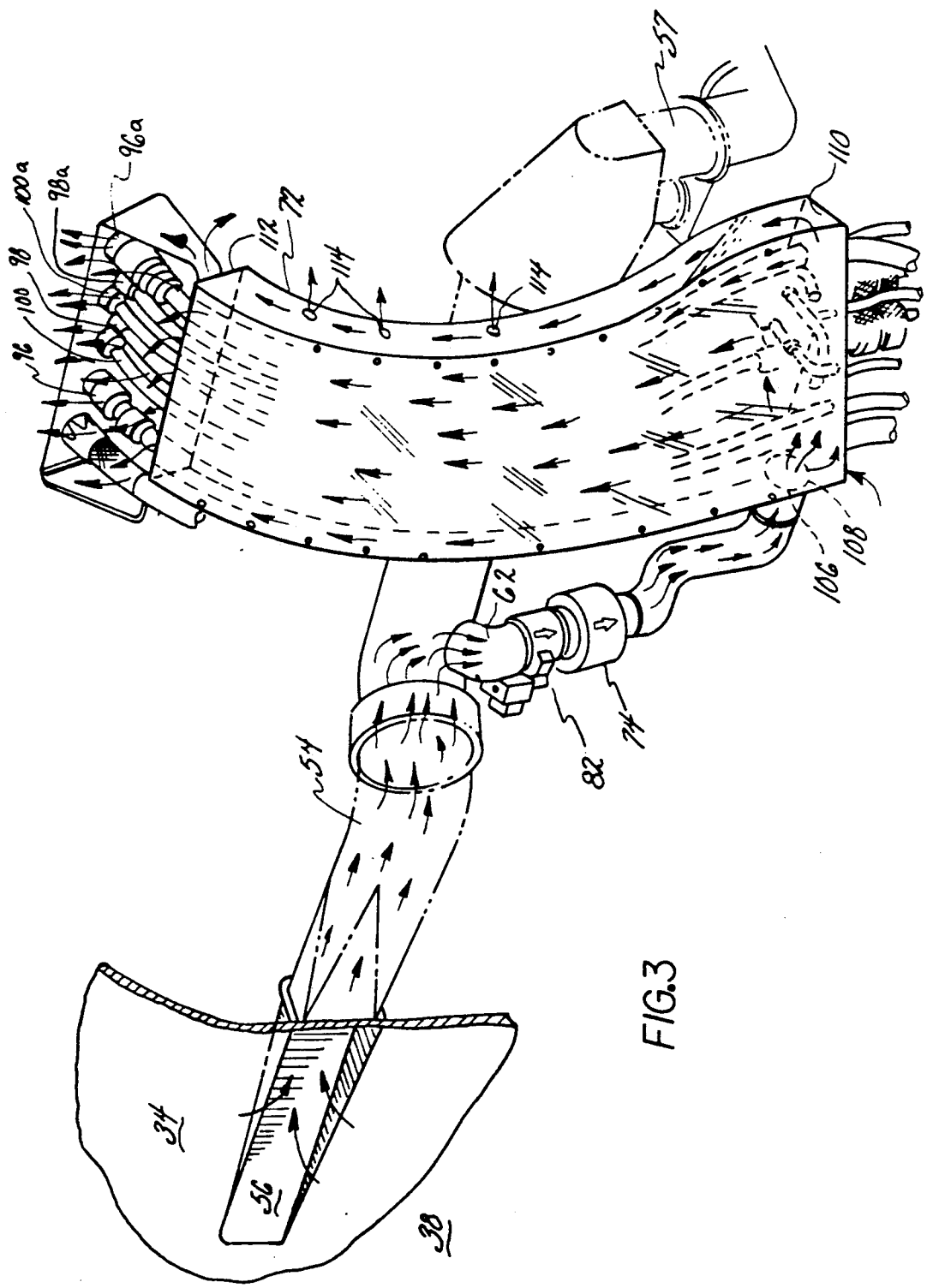
FIG. 3 is a diagrammatic view of a portion of the hydraulic system, a first passage for ducting cooling air to the clearance control system during engine operation and a second passage for ducting buffer air to a buffer region of the nacelle.

FIG. 3 is a diagrammatic view of the first passage 54, the second passage 62, the hydraulic conduits 96, 98, 100 shown in FIG. 2, and the shroud 72 for the conduits. The shroud contains conduits for two hydraulic pump systems. Accordingly two suction conduits 96, 96a; two pressure conduits 98, 98a; and, two case drain conduits 100, 100a are shown.

With regard to the air passages, the first passage 54 is in flow communication through the first opening 56 in the nacelle wall 34 with the secondary flowpath 38. This enables the first passage to supply pressurized air to the clearance control system via the first valve 57.

The second passage 62 has the second valve 82 for turning on the flow of buffer air through the first opening to the shroud 72 after the cessation of engine operations. An opening 106 in the second passage in flow communication with a corresponding opening 108 in the shroud so that the shroud is adapted to receive cooling air from the second passage.

The shroud 72 has a first end 110 which is closely adjacent to the opening 108. The shroud has a second end 112 spaced from the first end. Buffer air is flowed from the first end to the second end where the air is discharged into the core nacelle 18 and mixes with the nacelle air. Additional openings 114 in the shroud may be provided to tailor cooling flow within the shroud or provide the entire exhaust flow from the shroud in embodiments where the second end is closed.

Figure 4:
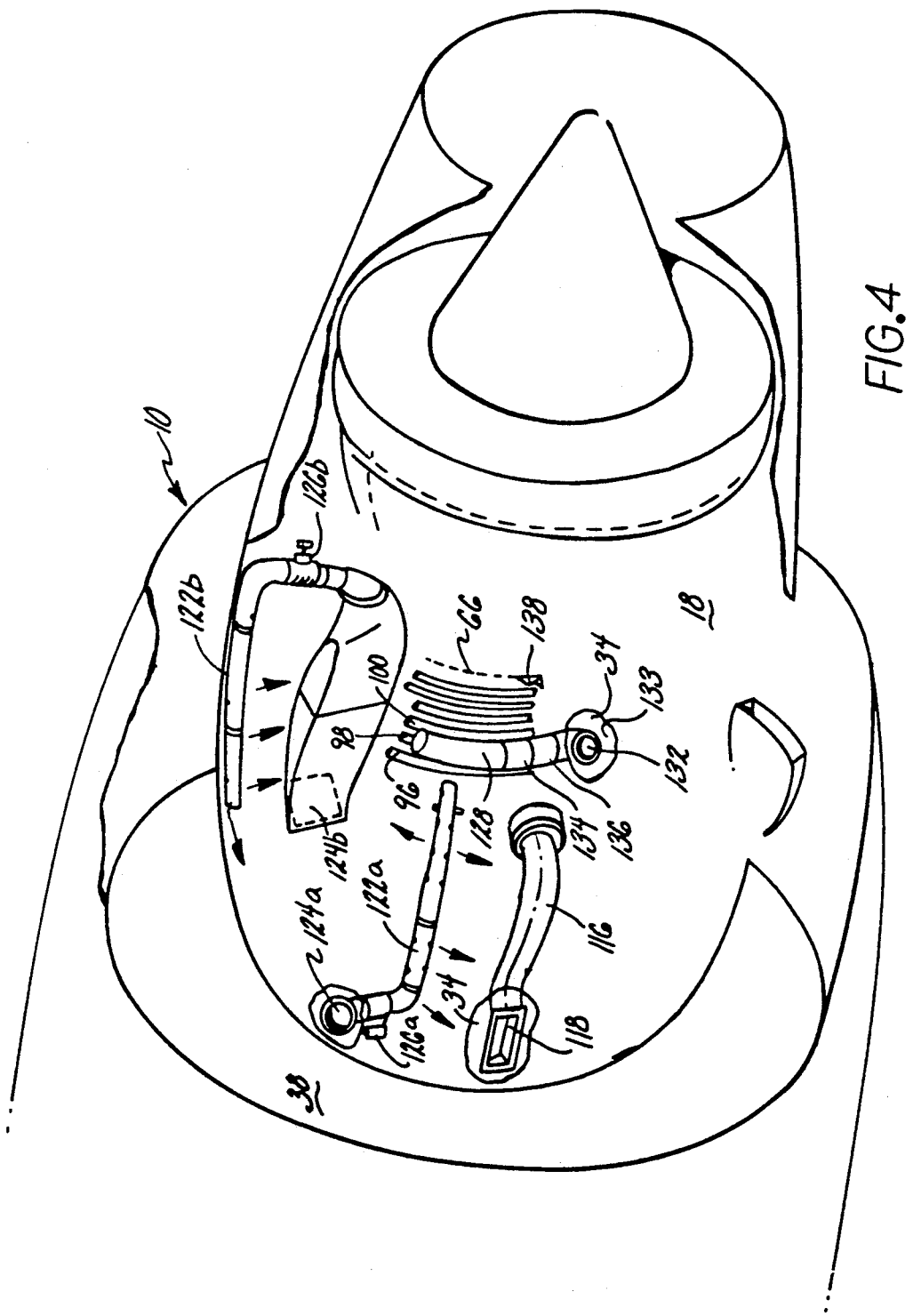
FIG. 4 is diagrammatic view of portions of the core nacelle and fan nacelle showing the relationship of the gas turbine engine to passages for cooling air and for buffer air and conduits for hydraulic fluid.

FIG. 4 is a diagrammatic view of an alternate embodiment of the core nacelle corresponding to the view shown in FIG. 1. Three sources of cooling air are shown for the compartment during engine operation. The first source of cooling air is the first passage 116 for the clearance control system which receives cooling air from the secondary flow path 38 via the opening 118. Two third passages, such as the axially extending spray bars 122a, 122b at the top of the nacelle compartment are provided to further ventilate the open nacelle during engine operation. The spray bars are in flow communication with the secondary flow path through the openings 124a and 124b. Ventilation is made possible by having an interior which is open, that is, is not divided into separate compartments. As a result, the cool air and warm air in the compartment can freely circulate during operation of the engine.

The axially extending spray bars 122a, 122b and their associated openings 124a and 124b might provide an alternate source of buffer air upon the cessation of engine operation. In such constructions, the second passage for buffer air is connected upstream of the valves 126a and 126b in the axially extending spray bars.

Alternatively, a separate passage 128 for buffered air might extend directly from the outer wall 34 of the nacelle. The passage has an opening 132 in the outer wall of the nacelle placing the passage in flow communication with the secondary flowpath 38. This embodiment provides direct flow to the buffer region 66 but has the disadvantage of penetrating the nacelle wall at a third location 133, disturbing the secondary flowpath with an opening which is used only after engine operation. An electric fan 134 and a valve 136 are provided to the passage. The valve in the passage shuts off the passage to block the fan against windmilling and to provide a firebreak.

In this alternate embodiment, a shroud is not provided to the conduits 96,98,100. The buffer region 66 is created by discharging buffer air after the cessation of engine operation to a preselected area of the nacelle. A shield 138 might be disposed between the conduits and the engine to shield the conduits from heat transfer by radiation.

During operation of the gas turbine engine 12 shown in FIG. 1, working medium gases in the form of air are drawn into the engine. The gases are compressed in the compression section 22, causing the temperature and pressure of the working medium gases to increase The gases are flowed to the combustion section 28 where fuel is injected into the combustion section and burned with the gases to increase their pressure and temperature. The hot pressurized gases are expanded through the turbine section 30 of the engine to power the aircraft and to provide energy required to compress the working medium gases in the compression section.

A portion of the working medium gases are withdrawn through the opening 56 through the first passage 54 and discharged on the exterior 46,48 of the turbine to cool the turbine and thereby adjust operational clearances within the turbine. The discharged cooling air then flows through the core compartment 20 and is discharged through openings (not shown) from the core nacelle, ventilating the core nacelle during engine operation. The cooling air discharged from the clearance control system is supplemented by cooling air discharged at the top region of the nacelle compartment by one or more axially extending spray bars as represented by the spray bars 122a,122b. The cooler air reduces the temperature of the hotter air which collects at the upper region of a nacelle compartment. The cooler air flows into the remainder of the compartment, mixing with air from the clearance control system, because of the uncompartmented construction of the interior to decrease the temperature of the air within the entire compartment.

Hydraulic fluid is flowed through the suction conduit 96 to the hydraulic pump 102. The fluid is pressurized in the pump and flowed through the pressure conduit 98 to the aircraft where it is used for hydraulic devices. Leakage or bleed flow from the hydraulic pump flows via the case drain to the hydraulic supply tank in the engine where the fluid is collected. The fluid, although heated by the work of compression in the hydraulic pump, does not gain a significant amount of heat from the interior of the nacelle by reason of short exposure of the fluid to the environment of the nacelle as it flows through the conduits and the lower temperature of the environment of the nacelle resulting from ventilation of the nacelle.

The hydraulic fluid ceases to flow upon cessation of operation of the engine. Sensible heat is transferred from the engine to air within the nacelle compartment 20. No cooling air is provided to the nacelle compartment via the manifold 52 of the clearance control system or the axially extending spray bars. Accordingly, the temperature of the air within the nacelle begins to rise as it receives heat from the engine and other heated components. The thermal capacitance of the engine and the air in the nacelle compartment are such that the engine temperature slowly decreases in comparison to the rapid increase in temperature of the air in the nacelle compartment.

At the same time as the temperature of the nacelle interior begins to rise, the control means 58 detects the cessation of operation, turns on the buffer fan to positively move air through the second passage 62, and opens the second valve to permit air to flow through the second passage. The control means closes the first valve 57 to avoid the loss of cooling air through the first passage 54 downstream of the second valve and to provide a firebreak. A timer in the control means causes the fan to operate for a predetermined period of time. Alternatively, a temperature detector in the buffer region 66 may be used to control the duration of fan operation.

The buffer air flowed to the buffer region blocks the hot air in the nacelle from moving into the buffer region and transferring heat by convection to the hydraulic conduits. The temperature of the buffer region air during the period in which buffer air is flowed to the buffer region is cooler than the air in the nacelle compartment and is cooler than the temperature of the hydraulic fluid. The difference in temperature between the nacelle compartment air and the buffer region air is a function of the amount of buffer air flowed to the core compartment. For very low flow rates, the core compartment temperature will approach the line $N_1$. As flow rates of buffer region air increase to a higher level, the temperature limit of nacelle compartment air is the temperature line $B_1$. The line $N_2$ is an intermediate value between these two limits for flow rates between the high and low level.

Figure 5:
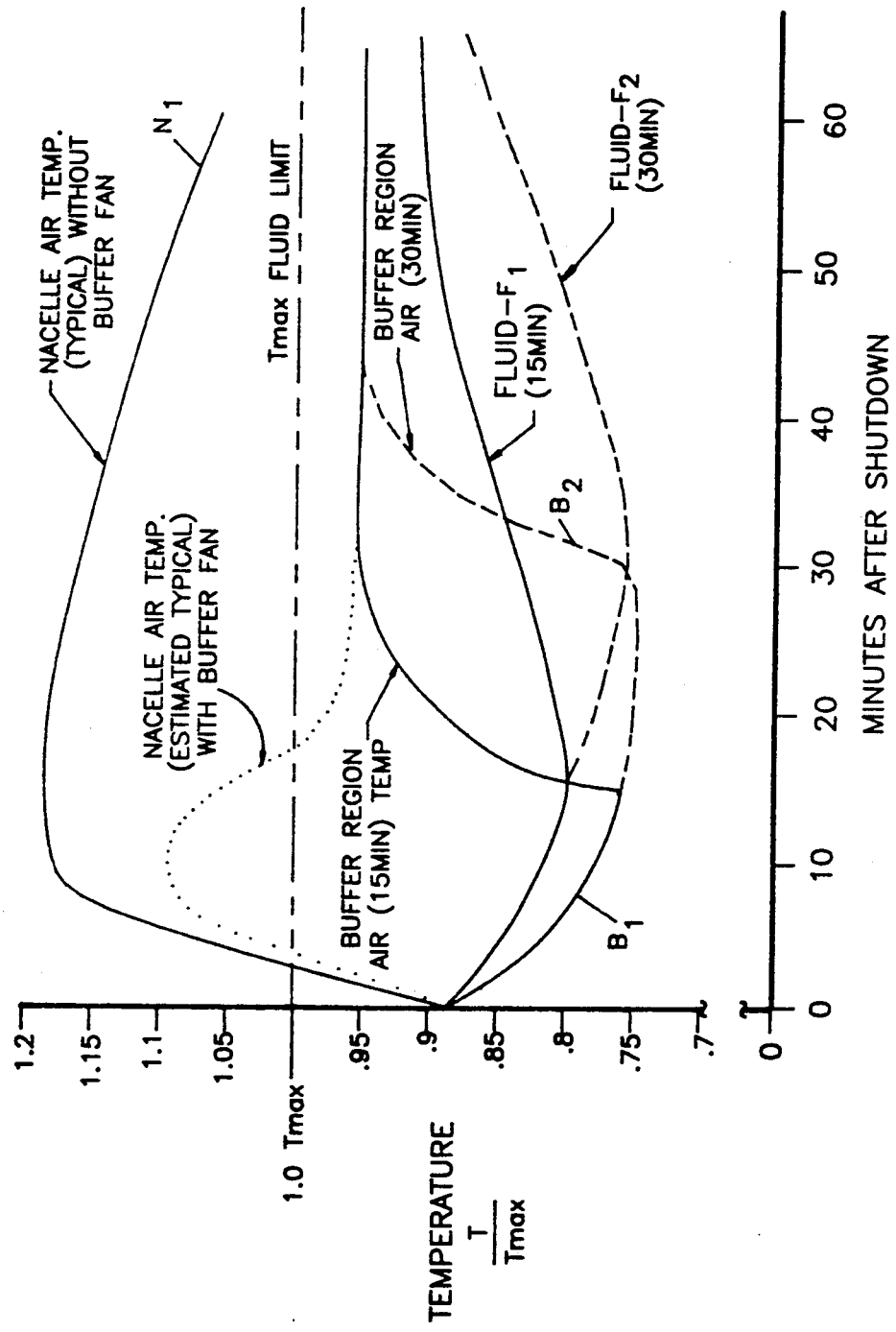
FIG. 5 is a graphical representation of the temperature of the nacelle compartment as a function of time after engine shutdown with and without the buffer fan.

As shown in FIG. 5, turning off the buffer air at fifteen minutes allows the buffer region air temperature to rise as it is replaced by the nacelle compartment air. The temperature of the nacelle compartment air reaches a temperature which is approximately ninety-five percent (95%) of the maximum temperature of the hydraulic fluid by reason of cooling of the engine and the nacelle compartment air slowly losing heat to the environment external of the aircraft. Were the buffer air turned off prior to the pre-selected time of fifteen minutes, the interface air temperature would rise closer to the maximum temperature limit T max for the hydraulic fluid. Curve $B_2$ and $F_2$ show the buffer region air and hydraulic fluid temperature after operation of the buffer air fan for thirty minutes and show the effect of overcooling on the hydraulic fluid temperature.

A particular advantage of this invention is the thermal life of the hydraulic fluid which results from keeping the hydraulic fluid below the maximum allowable temperature T max. Increasing the thermal capacitance of the case drain line by making the diameter equal to the diameter of the pressure line reduces the amount of buffer cooling that is required. Increasing the thermal capacitance has, in some constructions, made it possible for the nacelle compartment to reach a temperature which is less than T max prior to the time that the hydraulic fluid and the case drain conduit are heated to the temperature of the nacelle compartment.

A second advantage is the small amount of power which is used to provide buffer air to a localized region of the nacelle. Using the buffer system with a small buffer region simplifies the complexity of the nacelle by avoiding the need to compartment the nacelle. The buffer system has reduced power requirements and size for the blowers and passages in comparison to systems which are designed to completely cool the whole nacelle area to prevent heat transfer from the nacelle compartment environment to the hydraulic fluid during the first minutes of engine shutdown.

Although the invention has been shown and described with respect to detailed embodiments thereof, it should be understood by those skilled in the art that at various changes in form and detail thereof may be made without departing from the spirit and scope of the claimed invention.

We claim:

1. A method for ventilating the core nacelle compartment of a turbofan gas turbine engine which comprises the steps of:

flowing air during engine operative conditions from the exterior of the nacelle into the interior of the nacelle by discharging the air from at least one passage from a first location in the upper region of the nacelle core compartment under most operative conditions of the engine and discharging the air from at least one passage at a second location adjacent the outer case of the engine for impinging cooling air on the exterior of the engine during selected engine operative conditions;

flowing the air from both locations throughout the interior of the nacelle such that the air from both locations is capable of mixing;

discharging the air from the nacelle core compartment during engine operative conditions to ventilate the nacelle core compartment; and, flowing buffer air during non-operative engine conditions from the exterior of the nacelle through a passage to the interior of the nacelle to a third location in which is disposed a temperature sensitive component to form a buffer region of air about at least a portion of the component to block convective heating of the component after the cessation of engine operation by air which is heated by the sensible heat of the engine.

2. The method for ventilating the core nacelle of claim 1 wherein the method of flowing buffer region air includes the step of flowing a portion of the buffer region air through the passage in flow communication with the second location adjacent the outer case.

3. The method for ventilating the core nacelle of claim 1 wherein the step of flowing air to the buffer region includes the step of sensing the temperature of the buffer region to stop the flow of cooling air to the buffer region.

4. The method for ventilating the core nacelle of claim 1 wherein the step of flowing air to the buffer region includes the step of flowing the buffer air for a predetermined amount of time after the cessation of engine operation.

* * * * *